(12) United States Patent
Rutgers

(10) Patent No.: US 9,655,190 B2
(45) Date of Patent: May 16, 2017

(54) RIPPLE BASED LIGHT EMITTING DIODE DRIVING

(71) Applicant: PHILIPS LIGHTING HOLDING B.V., Eindhoven (NL)

(72) Inventor: Andrew Ulrich Rutgers, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/109,097

(22) PCT Filed: Dec. 23, 2014

(86) PCT No.: PCT/EP2014/079177
§ 371 (c)(1),
(2) Date: Jun. 29, 2016

(87) PCT Pub. No.: WO2015/101559
PCT Pub. Date: Jul. 9, 2015

(65) Prior Publication Data
US 2016/0330814 A1    Nov. 10, 2016

(30) Foreign Application Priority Data
Jan. 6, 2014    (EP) .................................. 14150187

(51) Int. Cl.
*H05B 37/00*    (2006.01)
*H05B 39/00*    (2006.01)
(Continued)

(52) U.S. Cl.
CPC ..... *H05B 33/0845* (2013.01); *H05B 33/0818* (2013.01); *H05B 33/0854* (2013.01);
(Continued)

(58) Field of Classification Search
None
See application file for complete search history.

(56) References Cited

U.S. PATENT DOCUMENTS

2008/0042599 A1    2/2008    Ashdown
2009/0251071 A1    10/2009    Gater et al.
(Continued)

FOREIGN PATENT DOCUMENTS

DE    10245626 A1    4/2004
DE    202011052537 U1    4/2012
(Continued)

*Primary Examiner* — Anh Tran

(57) ABSTRACT

Drivers (10) for driving first and second light emitting diode circuits (1, 2) that produce first and second light may comprise first generators (11) for in response to ripple information generating first control signals and first controllers (12) for in response to the first control signals controlling first intensities of the first light such that a sum of the first and second intensities the first and second light is less fluctuating than each one of these intensities. The ripple information defines parameters of ripples resulting from rectifications of alternating-current signals. The drivers (10) may further comprise second generators (21) for in response to the ripple information generating second control signals and second controllers (22) for in response to the second control signals controlling the second intensities. Ripple based flickering is reduced and smaller capacitors can be used.

12 Claims, 2 Drawing Sheets

(51) Int. Cl.
 *H05B 41/14* (2006.01)
 *H05B 33/08* (2006.01)
(52) U.S. Cl.
 CPC ..... *H05B 33/0857* (2013.01); *H05B 33/0827* (2013.01); *H05B 33/0872* (2013.01)

(56) References Cited

U.S. PATENT DOCUMENTS

| | | |
|---|---|---|
| 2010/0141174 A1 | 6/2010 | Negrete |
| 2010/0207543 A1 | 8/2010 | Crawford et al. |
| 2011/0031899 A1 | 2/2011 | Chen et al. |
| 2012/0068617 A1 | 3/2012 | Matsuda et al. |
| 2012/0098869 A1 | 4/2012 | Tseng |

FOREIGN PATENT DOCUMENTS

| | | |
|---|---|---|
| JP | 2009277582 A | 11/2009 |
| WO | WO2008022443 A1 | 2/2008 |
| WO | WO2013120768 A1 | 8/2013 |

RIPPLE BASED LIGHT EMITTING DIODE DRIVING

CROSS-REFERENCE TO PRIOR APPLICATIONS

This application is the U.S. National Phase application under 35 U.S.C. §371 of International Application No. PCT/EP2014/079177, filed on Dec. 23, 2014, which claims the benefit of European Patent Application No. 14150187.4, filed on Jan. 6, 2014. These applications are hereby incorporated by reference herein.

FIELD OF THE INVENTION

The invention relates to a driver for driving first and second light emitting diode circuits, and relates to an apparatus comprising the driver and further comprising the first and second light emitting diode circuits, and relates to a device comprising the driver and further comprising a converter for feeding the first and second light emitting diode circuits. Examples of such an apparatus are lamps and light modules. Examples of such a device are converters and supplies.

BACKGROUND OF THE INVENTION

US 2010/0141174 A1 discloses a current ripple reduction circuit for a light emitting diode circuit. Thereto, a current regulator is connected serially to the light emitting diode circuit for reducing a current ripple.

SUMMARY OF THE INVENTION

It is an object of the invention to provide an improved driver. Further objects of the invention are to provide an apparatus and a device.

According to a first aspect, a driver is provided for driving first and second light emitting diode circuits, the first light emitting diode circuit producing first light, the second light emitting diode circuit producing second light, the driver comprising:
- a first generator adapted to retrieve ripple information, for in response to the ripple information generating a first periodic control signal having a frequency equal to the ripple frequency and a varying magnitude, the first control signal having a first time delay with respect to the ripple, and
- a first controller for in response to the first control signal controlling a first intensity of the first light, a sum of the first intensity of the first light and a second intensity of the second light being less fluctuating than the first intensity.

The first control signal characteristics notably depend on the ripple information, the operating characteristics of the light emitting diode circuits, the second intensity of the second light.

A driver for driving first and second light emitting diode circuits comprises a first generator for in response to ripple information generating a first control signal. Usually, an alternating-current signal or a rectified version thereof is offered to a converter for feeding the first and second light emitting diode circuits while being driven by the driver. Such an alternating-current signal is responsible for a ripple in/on an output signal of the converter. This ripple is responsible for fluctuations in first and second intensities of first and second light produced by the first and second light emitting diode circuits. These fluctuations are known as flickering. This flickering is annoying.

By having added a first controller to the driver for in response to the first control signal controlling a first intensity of the first light such that a sum of the first intensity of the first light and the second intensity of the second light comprises smaller fluctuations than the first intensity or no fluctuations at all, the flickering is reduced. This is a great advantage. In such an embodiment, the second intensity of the second light can be known a priori, if operating performance of the second light emitting diode circuit is known. In other embodiments, the second intensity may be determined based on measurement of electrical signal parameters, such as an operating current or voltage, or based on optical measurements for actually appreciating the light output intensity.

So, the improved driver reduces fluctuations in the sum of the first and second intensities of the first and second light. Preferably, said fluctuations are fully removed. The improved driver uses the fact that the human eye will be less able to distinguish between the first light coming from the first light emitting diode circuit and the second light coming from the second light emitting diode when both light emitting diode circuits form part of the same lamp or the same light module. In view of the fact that the first and second intensities and their sum are intensities as perceived by a human being, the expression "a sum of the first intensity of the first light and a second intensity of the second light being less fluctuating than the first intensity" corresponds with "a sum of the first intensity of the first light and a second intensity of the second light appearing less fluctuating than the first intensity".

Compared to the above discussed US 2010/0141174 A1, the improved driver does not require an additional power dissipating regulator in a serial combination with a light emitting diode circuit, which is another great advantage.

Compared to US 2008/0042599 A1, which discloses ripple compensation based on current feedback and/or optical feedback, the improved driver does not require a current feedback and/or an optical feedback for ripple reduction, which is a great advantage.

Compared to DE 102 45 626 A1, which discloses ripple compensation based on optical feedback, the improved driver does not require an optical feedback for ripple reduction, which is a great advantage.

Compared to WO 2013/120768 A1, which discloses a power dissipating opposite phase ripple current generating circuit and a power dissipating combiner for at an output of a converter combining an original current and an opposite phase ripple current, the improved driver does not require such additional power dissipating components, which is a great advantage.

A light emitting diode circuit comprises one or more light emitting diodes of whatever kind and in whatever combination. A third (fourth etc.) light emitting diode circuit for producing third (fourth etc.) light is not to be excluded.

An embodiment of the driver is defined by the first and second light emitting diode circuits being fed via an output signal provided by a converter, the output signal comprising a ripple, the ripple information defining a parameter of the ripple. Usually, a ripple results from a rectification of an alternating-current signal ahead of a converter or inside a converter. The output signal of the converter then comprises this ripple. This output signal is used for feeding the first and second light emitting diode circuits. As a result, the first and second intensities of the first and second light will comprise first and second ripples. By controlling at least one of the first and second intensities such that a sum of the first and second intensities comprises smaller fluctuations than each one of them or no fluctuations at all, the flickering is reduced.

An embodiment of the driver is defined by a first distance in time between a first maximum of the first intensity and a maximum of the ripple being unequal to zero. Preferably, to create a kind of anti-phase situation for (the first and second ripples in/on) the first and second intensities, a first distance in time between a first maximum of the first intensity and a maximum of the ripple in/on the output signal of the converter will be substantially equal to half a period of the ripple. The first maximum of the first intensity and the maximum of the ripple are two maxima closest to each other in time.

An embodiment of the driver is defined by the ripple resulting from a rectification of an alternating-current signal, the parameter of the ripple comprising a moment in time at which an amplitude of the ripple reaches a ripple value and/or comprising a moment in time at which an amplitude of the alternating-current signal reaches a signal value. A ripple value may be a maximum of the ripple or a minimum of the ripple or an average value of the ripple etc. A signal value may be a maximum of the alternating-current signal or a minimum of the alternating-current signal or a zero-crossing of the alternating-current signal etc. Usually, at a zero-crossing of the alternating-current signal, an amplitude of the ripple will show a minimum, and between two zero-crossings of the alternating-current signal, an amplitude of the ripple will show a maximum etc.

An embodiment of the driver is defined by the first controller comprising a first transistor circuit for in response to the first control signal controlling a first amplitude of the first intensity. This is a low cost and simple and robust embodiment. A first transistor circuit may comprise one or more transistors of whatever kind and in whatever combination.

An embodiment of the driver is defined by said control of the first amplitude of the first intensity comprising switching a first current flowing through the first light emitting diode circuit on and off with a first duty cycle defined by the first control signal. This is a relatively digital embodiment. Alternatively, according to a relatively analog embodiment, a size of an amplitude of a first current flowing through the first light emitting diode circuit may be controlled.

An embodiment of the driver is defined by the driver further comprising
 a second generator for in response to the ripple information generating a second control signal, and
 a second controller for in response to the second control signal controlling the second intensity.

According to this embodiment, both first and second intensities are controlled individually. This embodiment offers more control options.

An embodiment of the driver is defined by the sum of the first and second intensities being less fluctuating than the second intensity. Again, in view of the fact that the first and second intensities and their sum are intensities as perceived by a human being, the expression "a sum of the first and second intensities being less fluctuating than the second intensity" corresponds with "a sum of the first and second intensities appearing less fluctuating than the second intensity".

An embodiment of the driver is defined by the first and second light emitting diode circuits being fed via an output signal provided by a converter, the output signal comprising a ripple, the ripple information defining a parameter of the ripple, the first light emitting diode circuit having a higher efficiency to human perception than the second light emitting diode circuit, and a first distance in time between a first maximum of the first intensity and a maximum of the ripple being larger than a second distance in time between a second maximum of the second intensity and the maximum of the ripple. Preferably, the light emitting diode circuit with a higher efficiency to human perception than the other one should be driven according to a larger kind of anti-phase situation with respect to the ripple in/on the output signal of the converter than the other one. The first maximum of the first intensity and the maximum of the ripple are two maxima closest to each other in time. The second maximum of the second intensity and the maximum of the ripple are also two maxima closest to each other in time.

An embodiment of the driver is defined by the first distance in time being substantially equal to half a period of the ripple and the second distance in time being substantially equal to zero. This embodiment will perform relatively optimally. The light emitting diode circuit with a higher efficiency to human perception is driven according to an anti-phase situation with respect to the ripple in/on the output signal of the converter, and the light emitting diode circuit with a lower efficiency to human perception is driven according to an in-phase situation with respect to the ripple in/on the output signal of the converter.

An embodiment of the driver is defined by the first controller comprising a first transistor circuit for in response to the first control signal controlling a first amplitude of the first intensity, and the second controller comprising a second transistor circuit for in response to the second control signal controlling a second amplitude of the second intensity. This is a low cost and simple and robust embodiment. Each one of the first and second transistor circuits may comprise one or more transistors of whatever kind and in whatever combination.

An embodiment of the driver is defined by said control of the first amplitude of the first intensity comprising switching a first current flowing through the first light emitting diode circuit on and off with a first duty cycle defined by the first control signal, and said control of the second amplitude of the second intensity comprising switching a second current flowing through the second light emitting diode circuit on and off with a second duty cycle defined by the second control signal. This is a relatively digital embodiment. Alternatively, according to a relatively analog embodiment, a size of an amplitude of a first current flowing through the first light emitting diode circuit and a size of an amplitude of a second current flowing through the second light emitting diode circuit may be controlled.

An embodiment of the driver is defined by the first and second light having different colors, the driver further comprising
 a third generator for generating a third control signal having a frequency higher than a frequency of an alternating-current signal, and
 a first adder for adding the third control signal to the first control signal and a second adder for adding the third control signal to the second control signal, the third signal being out of phase with each one of the first and second control signals for reducing a color shift in a sum of the first and second light.

Usually, when introducing a kind of phase-shift situation between (the first and second ripples in/on) the first and second intensities of the first and second light emitting diode circuits, a color shift in a sum of the first and second light will increase. Such a color shift is however less annoying than said flickering. To reduce this color shift, a third generator for generating a third control signal having a frequency higher than a frequency of an alternating-current signal and first and second adders for adding the third control signal to the first and second control signals may be introduced. The third signal should be out of phase with each one of the first and second control signals for reducing the color shift in the sum of the first and second light.

According to a second aspect, an apparatus is provided comprising the driver as defined above and further comprising the first and second light emitting diode circuits.

According to a third aspect, a device is provided comprising the driver as defined above and further comprising a converter for feeding the first and second light emitting diode circuits. The converter can be any kind of converter, including a linear regulator etc.

A basic idea is that of two or more light emitting diode circuits one of them can be controlled relatively independently from the other one(s) to compensate for the ripples on their intensities.

A problem to provide an improved driver has been solved. A further advantage is that a value of a capacitor for reducing a ripple in case the improved driver is used can become at least ten times smaller than a value of a capacitor for reducing the ripple in case the improved driver is not used.

These and other aspects of the invention will be apparent from and elucidated with reference to the embodiments described hereinafter.

DETAILED DESCRIPTION OF EMBODIMENTS

Figure 1:
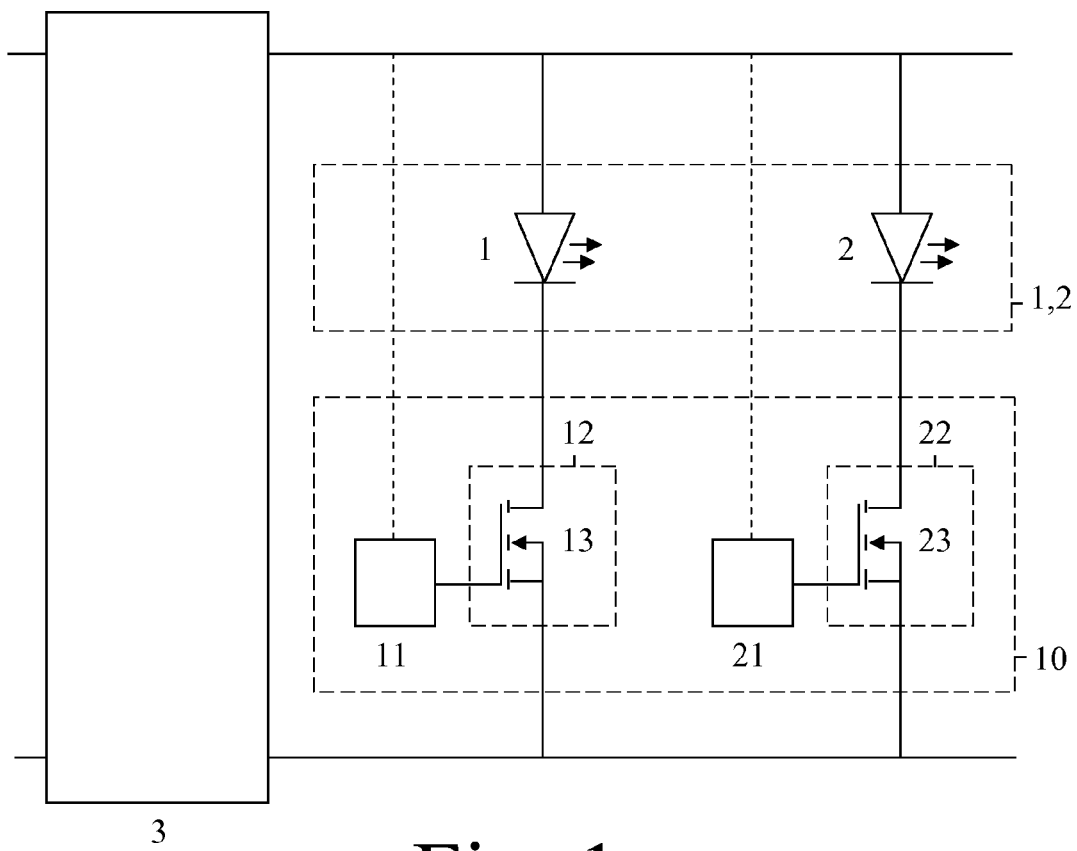
FIG. 1 shows a first embodiment of a driver.

In the FIG. 1, a first embodiment of a driver 10 is shown. The two channel driver 10 comprises—for driving a first channel—a first generator 11 for in response to ripple information generating a first control signal and a first controller 12 for in response to the first control signal controlling a first intensity of first light coming from a first light emitting diode circuit 1. Thereto, a first main electrode of the first controller 12 is coupled to a cathode of the first light emitting diode circuit 1, and an anode of the first light emitting diode circuit 1 is coupled to a first output terminal of a converter 3. A second main electrode of the first controller 12 is coupled to a second output terminal of the converter 3. A control electrode of the first controller 12 is coupled to an output of the first generator 11. An input of the first generator 11 is for example coupled to the first output terminal of the converter 3.

The two channel driver 10 comprises—for driving a second channel—a second generator 21 for in response to the ripple information generating a second control signal and a second controller 22 for in response to the second control signal controlling a second intensity of second light coming from a second light emitting diode circuit 2. Thereto, a first main electrode of the second controller 22 is coupled to a cathode of the second light emitting diode circuit 2, and an anode of the second light emitting diode circuit 2 is coupled to the first output terminal of the converter 3. A second main electrode of the second controller 22 is coupled to the second output terminal of the converter 3. A control electrode of the second controller 22 is coupled to an output of the second generator 21. An input of the second generator 21 is for example coupled to the first output terminal of the converter 3.

The two channel driver 10 is arranged to drive the first and second light emitting diode circuits 1, 2. However, a one channel driver for driving only one of two or more light emitting diode circuits and a three or more channel driver for driving three or more light emitting diode circuits are not to be excluded.

Input terminals of the converter 3 can be coupled to an alternating-current signal source, in which case a rectification is performed inside the converter 3. Alternatively, the input terminals of the converter 3 can be coupled to an alternating-current signal source via a rectifier circuit such as for example a four diode rectifier bridge, in which case a rectification is performed ahead of the converter 3.

The rectification usually results in a ripple (in Europe a 100 Hz ripple, in the USA a 120 Hz ripple), which ripple is present in/on an output signal of the converter 3. When no precautions are taken, the ripple will be visible in the light produced by the first and second light emitting diode circuits 1, 2. This visible ripple is known as flickering. This flickering is annoying. To reduce the visible ripple, a large capacitance for reducing an amplitude of the ripple can be introduced. Such a large capacitance is disadvantageous.

The improved driver 10 reduces said flickering by letting the first generator 11 in response to ripple information generate a first control signal and by letting the first controller 12 in response to the first control signal control a first intensity of the first light coming from a first light emitting diode circuit 1 such that a sum of the first intensity of the first light and a second intensity of the second light is less fluctuating than each one of the first and second intensities. And, preferably, by letting the second generator 21 in response to the ripple information generate a second control signal and by letting the second controller 22 in response to the second control signal control the second intensity such that the sum of the first and second intensities is less fluctuating than each one of the first and second intensities. This will be further explained at the hand of the FIG. 3.

According to the exemplary embodiment shown in the FIG. 1, the first and second generators 11, 21 retrieve the ripple information from one or more of the output terminals of the converter 3, but alternatively they may retrieve the ripple information from somewhere inside the converter 3 or from one or more of the input terminals of the converter 3 or from a rectifier circuit not shown and coupled to the input terminals of the converter 3. This ripple information for example defines a parameter of the ripple resulting from the rectification of the alternating-current signal. This parameter of the ripple for example comprises a current magnitude or voltage magnitude of the ripple, a peak to peak current or voltage amplitude of the ripple, a moment in time at which an amplitude of the ripple reaches a ripple value (a positive or negative maximum value, an average value etc.) and/or comprising a moment in time at which an amplitude of the alternating-current signal reaches a signal value (a positive or negative maximum value, a zero-crossing etc.). This will also be further explained at the hand of the FIG. 3.

Preferably, the first controller 12 comprises a first transistor circuit 13 for in response to the first control signal controlling a first amplitude of the first intensity. And the second controller 22 comprises a second transistor circuit 23 for in response to the second control signal controlling a second amplitude of the second intensity. A transistor circuit may comprise one or more transistors. According to a relatively digital solution, said control of the first amplitude of the first intensity may comprise switching a first current flowing through the first light emitting diode circuit 1 on and off with a first duty cycle defined by the first control signal. And said control of the second amplitude of the second intensity may comprise switching a second current flowing through the second light emitting diode circuit 2 on and off with a second duty cycle defined by the second control signal. This way, average sizes of amplitudes flowing through the controllers 12, 22 are controlled. However, relatively analog solutions whereby instantaneous sizes of amplitudes of currents flowing through the controllers 12, 22 are controlled are not to be excluded.

Figure 2:
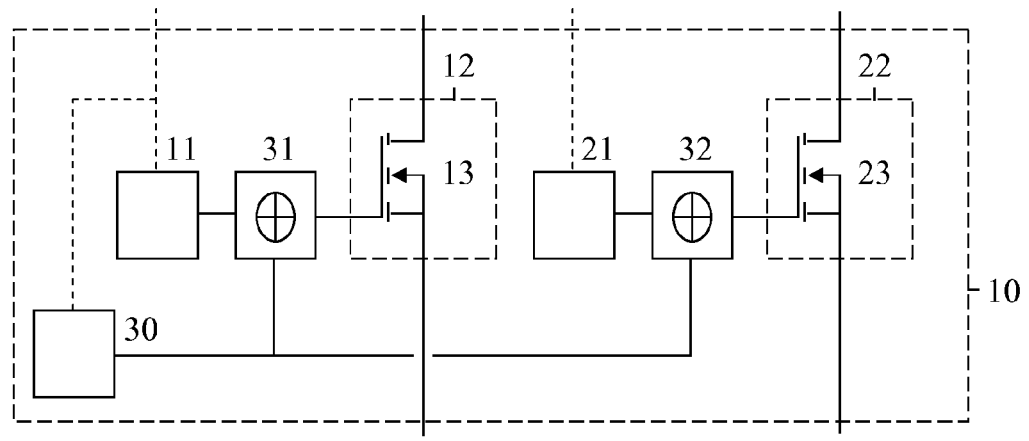
FIG. 2 shows a second embodiment of a driver.

In the FIG. 2, a second embodiment of a driver 10 is shown. This second embodiment differs from the first embodiment shown in the FIG. 1 in that, for the first and second light having different colors, the driver 10 has been provided with a third generator 30 for generating a third control signal having a frequency higher than a frequency of an alternating-current signal, with a first adder 31 for adding the third control signal to the first control signal and with a second adder 32 for adding the third control signal to the second control signal. The third signal should be out of phase with each one of the first and second control signals to reduce a color shift in a sum of the first and second light.

The first embodiment of the driver 10 shown in the FIG. 1 reduces flickering but at the same time increases a color shift in a sum of the first and second light. Such a color shift is less annoying than said flickering. To reduce this color shift, the third generator 30 and the first and second adders 31, 32 have been introduced.

Figure 3:
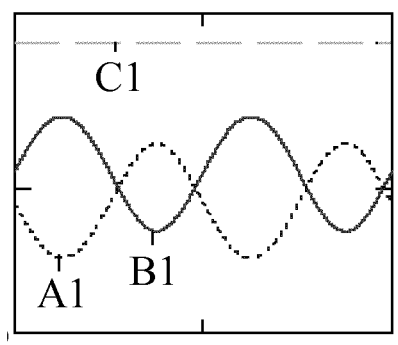
FIG. 3 shows average control signals and an overall intensity.

In the FIG. 3, average control signals and an overall intensity are shown (horizontal axis: time, vertical axis: amplitude). A first average control signal A1 is used to control the first intensity of the first light coming from the first light emitting diode circuit 1 comprising one or more white LEDs. The first intensity will have a shape similar to the one of the first average control signal A1. A second average control signal B1 is used to control the second intensity of the second light coming from the second light emitting diode circuit 2 comprising one or more red LEDs. The second intensity will have a shape similar to the one of the second average control signal B1. The first average control signal A1 comprises a fixed first amplitude and added thereto a varying first amplitude, with a frequency that is equal to that of the ripple. The first average control signal A1 has a first time delay with respect to the ripple. For example the first time delay may correspond to a zero phase angle. The second average control signal B1 comprises a fixed second amplitude and added thereto a varying second amplitude, with a frequency that is equal to that of the ripple. The second average control signal B1 has a second time delay with respect to the ripple. For example the second time delay may correspond to a phase angle of 90°. Owing to the fact that the first light emitting diode circuit 1 comprises white LEDs, it will have a higher efficiency to human perception than the second light emitting diode circuit 2 which comprises red LEDs. This is the reason that the fixed first amplitude of the first average control signal A1 has been chosen to be a bit smaller than the fixed second amplitude of the second average control signal B1. Sizes of the varying first and second amplitudes will usually be substantially identical.

The second average control signal B1 is for example in phase with a ripple present on/in the output signal of the converter 3, and the first average control signal A1 is for example out of phase with this ripple. As a result, the overall intensity C1 no longer shows any ripple. This overall intensity C1 is a sum of the first intensity of the first light and a second intensity of the second light. In the ideal situation, the overall intensity C1 won't show any ripple. In a non-ideal but still improved situation, the overall intensity C1 will be less fluctuating than each one of the first and second intensities.

The first and second average control signals A1 and B1 are average control signals. According to a more analog implementation, the average control signals may be identical to the real control signals. According to a more digital implementation, for example through duty cycle control, the real control signals will differ from the average control signals.

The first average control signal A1 results in first light emitting diode circuit 1 comprising one or more white LEDs producing the first light at the first intensity. To reduce the flickering in this case, a first distance in time between a first maximum of the first intensity and a maximum of the ripple should be unequal to zero.

In addition, the second average control signal B1 results in the second light emitting diode circuit 2 comprising one or more red LEDs producing the second light at the second intensity. To reduce the flickering in this case, a first distance in time between a first maximum of the first intensity and a maximum of the ripple should be larger than a second distance in time between a second maximum of the second intensity and the maximum of the ripple. Preferably, the first distance in time may be substantially equal to half a period of the ripple (an anti-phase situation) and the second distance in time may be substantially equal to zero (an in-phase situation).

Figure 4:
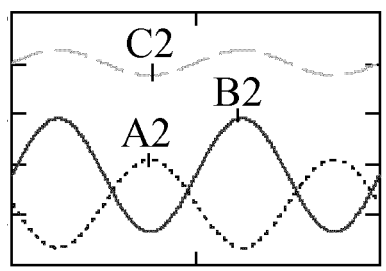
FIG. 4 shows average current waveforms.

In the FIG. 4, average current waveforms are shown (horizontal axis: time, vertical axis: amplitude). A first average current waveform A2 equals a first average current flowing through the first controller 12 and through the first light emitting diode circuit 1. A second average current waveform B2 equals a second average current flowing through the second controller 22 and through the second light emitting diode circuit 2. An overall average current waveform C2 equals a sum of the first and second average current waveforms A2 and B2. Clearly, the overall average current waveform C2 shows smaller fluctuations than each one of the first and second average current waveforms A2 and B2.

As an example only, a first current flowing through the first light emitting diode circuit 1 and the first controller 12 could be $I_1 = p + q \cdot \sin(2\pi f t)$, and a second current flowing through the second light emitting diode circuit 2 and the second controller 22 could be $I_2 = x + y \cdot \sin(2\pi f t)$, wherein $p = I_{dc}/(1+\gamma)$, $q = I_r/(1-(\epsilon_1/\epsilon_2))$, $x = I_{dc}/(1+(1/\gamma))$, $y = I_r/(1-\epsilon_2/\epsilon_1))$, wherein $\gamma$ is the DC ratio between the first and second channel, $\epsilon_1$ is the efficiency of the first channel as perceived by a person, $\epsilon_2$ is the efficiency of the second channel as perceived by a person, $I_r$ is an amplitude of a ripple current, and $I_{dc}$ is an average amplitude of an input current. A first command to the first channel as a fractional duty cycle could be equal to $I_1/I_{dc}$, and a second command to the second channel as a fractional duty cycle could be equal to $I_2/I_{dc}$, all without having excluded other formulas/equations.

Figure 5:
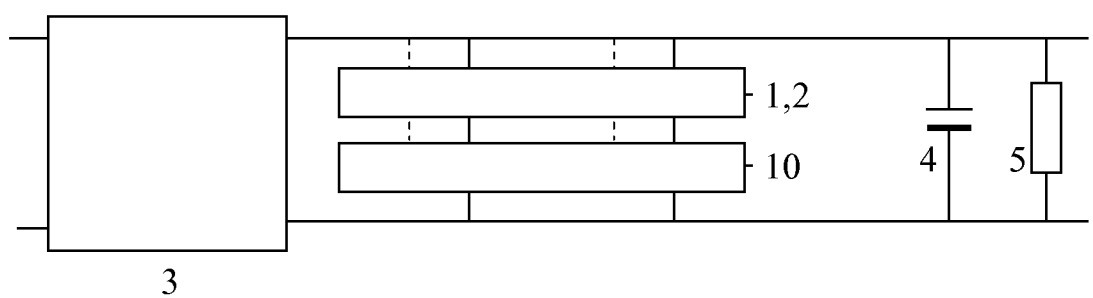
FIG. 5 shows an overview.

In the FIG. 5, an overview is shown. Compared to the first embodiment shown in the FIG. 1, this overview shows in addition a capacitor 4 and a resistor 5, each one coupled to the output terminals of the converter 3. By having introduced the driver 10 as shown in the FIG. 1, a value of the capacitor 4 can become at least ten times smaller than a value of a capacitor for reducing the ripple in case the driver 10 is not used.

First and second elements can be coupled indirectly via a third element and can be coupled directly without a third element being in between. Three or more channels and three or more light emitting diode circuits are not to be excluded. The first and second generators may be combined into one generator with two outputs. The first and second and third generators may be combined into one generator with three outputs. The third control signal should have a frequency higher than a frequency of an alternating-current signal (50 Hz or 60 Hz), preferably higher than a frequency of the ripple (100 Hz or 120 Hz), such as for example 400 Hz. The third control signal may have a sine shape, without having excluded other periodical shapes. Similarly, the varying first and second amplitudes may have sine shapes resulting in the first and second average control signals having sine shapes, without having excluded other periodical shapes. The first and second controllers 12, 22 may form part of a larger controller. Each one of these controllers may have a further input for in response to further information such as for example temperature information etc. adjusting another property of the light emitting diode circuits 1, 2 such as temperature compensation etc. One controller may control (light coming from) more than one light emitting diode circuit etc. One generator may generate more than one control signal and may generate a control signal destined for more than one controller etc.

Summarizing, drivers 10 for driving first and second light emitting diode circuits 1, 2 that produce first and second light may comprise first generators 11 for in response to ripple information generating first control signals and first controllers 12 for in response to the first control signals controlling first intensities of the first light such that a sum of the first and second intensities the first and second light is less fluctuating than each one of these intensities. The ripple information defines parameters of ripples resulting from rectifications of alternating-current signals. The drivers 10 may further comprise second generators 21 for in response to the ripple information generating second control signals and second controllers 22 for in response to the second control signals controlling the second intensities. Ripple based flickering is reduced and smaller capacitors can be used.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A driver for driving first and second light emitting diode circuits, the first light emitting diode circuit producing first light, the second light emitting diode circuit producing second light, the driver comprising a converter for feeding an output signal to the first and second light emitting diode circuits, the output signal comprising a ripple, the ripple comprising a ripple information defining a parameter of the ripple;

a first generator adapted to retrieve the ripple information, for in response to the ripple information generating a first periodic control signal having a frequency equal to the ripple frequency and a varying magnitude, the first control signal having a first time delay with respect to the ripple;

a first controller for in response to the first control signal controlling a first intensity of the first light, a second generator adapted to retrieve the ripple information, for in response to the ripple information generating a second periodic control signal having a frequency equal to the ripple frequency and a varying magnitude, the second control signal having a second time delay with respect to the ripple, and a second controller for in response to the second control signal controlling a second intensity of the second light, wherein the first and second time delays are such that a sum of the first intensity of the first light and the second intensity of the second light is less fluctuating than the first intensity.

2. The driver as defined in claim 1, adapted in such a way that a first distance in time between a first maximum of the first intensity and a maximum of the ripple is unequal to zero.

3. The driver as defined in claim 1, the ripple resulting from a rectification of an alternating-current signal, the parameter of the ripple comprising a moment in time at which an amplitude of the ripple reaches a ripple value and/or comprising a moment in time at which an amplitude of the alternating-current signal reaches a signal value.

4. The driver as defined in claim 1, the first controller comprising a first transistor circuit for in response to the first control signal controlling a first amplitude of the first intensity.

5. The driver as defined in claim 4, wherein the first controller is arranged to switch a first current flowing through the first light emitting diode circuit on and off with a first duty cycle defined by the first control signal.

6. The driver as defined in claim 1, the sum of the first and second intensities being less fluctuating than the second intensity.

7. The driver as defined in claim 1, the first light emitting diode circuit having a higher efficiency to human perception than the second light emitting diode circuit and a first distance in time between a first maximum of the first intensity and a maximum of the ripple being larger than a second distance in time between a second maximum of the second intensity and the maximum of the ripple.

8. The driver as defined in claim 6, adapted in such a way that the first distance in time being substantially equal to half a period of the ripple and the second distance in time being substantially equal to zero.

9. The driver as defined in claim 1, the first controller comprising a first transistor circuit for in response to the first control signal controlling a first amplitude of the first intensity, and the second controller comprising a second transistor circuit for in response to the second control signal controlling a second amplitude of the second intensity.

10. The driver as defined in claim 9, wherein the first controller is arranged to control the first amplitude of the first intensity switching a first current flowing through the first light emitting diode circuit on and off with a first duty cycle defined by the first control signal, and the second controller arranged to control the second amplitude of the second intensity by switching a second current flowing through the second light emitting diode circuit on and off with a second duty cycle defined by the second control signal.

11. The driver as defined in claim 1, the first and second light having different colors, the driver further comprising
   a third generator for generating a third control signal having a frequency higher than a frequency of an alternating-current signal, and
   a first adder for adding the third control signal to the first control signal and a second adder for adding the third control signal to the second control signal, the third signal being out of phase with each one of the first and second control signals for reducing a color shift in a sum of the first and second light.

12. An apparatus comprising the driver as defined in claim 1 and further comprising the first and second light emitting diode circuits.

* * * * *